(12) United States Patent
Jin et al.

(10) Patent No.: US 10,301,840 B1
(45) Date of Patent: May 28, 2019

(54) CANOPY ASSEMBLY WITH FASTENING ARRANGEMENT

(71) Applicants: Yan Jin, Pomona, CA (US); Qing Feng Lyu, Hangzhou (CN)

(72) Inventors: Yan Jin, Pomona, CA (US); Qing Feng Lyu, Hangzhou (CN)

( * ) Notice: Subject to any disclaimer, the term of this patent is extended or adjusted under 35 U.S.C. 154(b) by 0 days.

(21) Appl. No.: 15/954,599

(22) Filed: Apr. 17, 2018

(51) Int. Cl.
    *E04H 15/32* (2006.01)
    *F16H 31/00* (2006.01)

(52) U.S. Cl.
    CPC ......... *E04H 15/322* (2013.01); *F16H 31/001* (2013.01)

(58) Field of Classification Search
    CPC ..... B66D 5/32; B66D 5/34; B60P 7/08; B60P 7/0823; E04H 15/322
    See application file for complete search history.

(56) References Cited

U.S. PATENT DOCUMENTS

| | | | | |
|---|---|---|---|---|
| 3,939,729 A * | 2/1976 | Brockelsby | ............... | B66D 5/34 |
| | | | | 74/575 |
| 4,290,243 A * | 9/1981 | Mellin | .................... | E04H 15/64 |
| | | | | 135/120.4 |
| 4,337,553 A * | 7/1982 | Fischer | ................. | E04H 15/322 |
| | | | | 24/115 H |
| 4,487,212 A * | 12/1984 | Moore | ..................... | B60J 11/00 |
| | | | | 135/117 |
| 5,622,197 A * | 4/1997 | Valaire | .................. | E04H 15/003 |
| | | | | 114/106 |
| 9,254,779 B2 * | 2/2016 | Kingery | ................ | B60P 7/0823 |
| 2017/0284123 A1 * | 10/2017 | Pena | ..................... | E04H 15/322 |
| 2017/0363131 A1 * | 12/2017 | Pena | ..................... | E04H 15/322 |

* cited by examiner

*Primary Examiner* — Noah Chandler Hawk

(74) *Attorney, Agent, or Firm* — Tsz Lung Yeung

(57) ABSTRACT

A canopy assembly includes a canopy fabric, a plurality of tightening wires, and a fastening arrangement. The fastening arrangement includes a plurality of tension adjustment units. Each of the tension adjustment units includes a supporting frame, a ratchet gear, a main shaft connected to the ratchet gear and rotatably connected to the supporting frame, and a resilient locking member mounted on the supporting frame to move between a locked position and an unlocked position. In the locked position, the resilient locking member is pivotally moved to engage with the ratchet gear so as to limit the ratchet gear to incrementally rotate in one predetermined direction with respect to the supporting frame, When the resilient locking member is in the unlocked position, the resilient locking member is pivotally moved to disengage from the ratchet gear so as to allow the ratchet gear to freely rotate with respect to the supporting frame.

16 Claims, 11 Drawing Sheets

CANOPY ASSEMBLY WITH FASTENING ARRANGEMENT

BACKGROUND OF THE PRESENT INVENTION

Field of Invention

The present invention relates to a canopy and its accessory, and more particularly to a canopy assembly with a fastening arrangement which is capable of securely and reliably exerting tension to a tightening wire so as to efficiently extend and fasten a canopy fabric in a very convenient manner.

Description of Related Arts

A conventional canopy assembly usually comprise a canopy fabric and a plurality of fasteners provided on at least three corner portions of the canopy fabric for applying a certain amount of tension to the canopy fabric. The canopy fabric may then be stretched and extended and to be hung on an external object. The canopy fabric may be utilized for providing shade in certain area.

A conventional method for stretching the canopy fabric is to use a plurality of turnbuckles as the fasteners mentioned above. A conventional turnbuckle comprises a main body and two threaded hooks movably provided on two ends of the main body respectively. One of the threaded hooks may be affixed to an external object, such as a support on a wall, while another threaded hook may be affixed to a grommet provided on the canopy fabric. By rotating the threaded hooks with respect to the main body, the threaded hooks will travel along a longitudinal direction of the main body so as to increase or decrease a tension applied on the canopy fabric.

There exist several disadvantages in relation to the above-mentioned conventional turnbuckles in adjusting the tension of the canopy fabric. First, once the canopy fabric and the turnbuckles are installed into place, it is very difficult to adjust the tension applied to the canopy fabric. As mentioned earlier, the tension applied to the canopy depends on the longitudinal relative position of or distance traveled by the two threaded hooks. When a user needs to apply more tension to the canopy fabric, he may need to rotate either one or both of the threaded hooks. The user may need to detach the threaded hook from the external object (such as a wall or a post) and before he can rotate it. After that he may need to re-attach the threaded hook back to the external object. This process is extremely time-consuming.

Second, the attachment between the turnbuckle and the canopy or the external object is accomplished through a hook. This kind of connection may not be secure enough especially when the canopy is used in a windy environment.

Third, when the turnbuckles have been used for an extended period of time, the threaded hook may become more difficult to be turned. Moreover, the overall strength of the turnbuckles may deteriorate to such an extent that it may suddenly break when in use. This creates a potential danger to the people underneath.

As a result, there is a need to develop a canopy assembly which may improve upon the above-mentioned conventional canopy assembly resolve the above-mentioned problems.

SUMMARY OF THE PRESENT INVENTION

Certain variations of the present invention provide a canopy assembly comprising a fastening arrangement which is capable of securely and reliably exerting tension to a tightening wire so as to efficiently extend and fasten a canopy fabric in a very convenient manner.

Certain variations of the present invention provide a canopy assembly comprising a fastening arrangement in which a user may easily and conveniently adjust the tension applied to the canopy fabric.

In one aspect of the present invention, it provides a canopy assembly, comprising:

a canopy fabric having a main fabric portion and at least one corner portion;

at least one tightening wire connected to the corner portion of the canopy fabric, the tightening wire having a connecting portion; and a fastening arrangement comprising at least one tension adjustment unit, which comprises:

a supporting frame;

a ratchet gear;

a main shaft connected to the ratchet gear and rotatably connected to the supporting frame for driving the ratchet gear to rotate with respect to the supporting frame, the connecting portion of the tightening wire connecting to the main shaft; and a resilient locking member mounted on the supporting frame to move between a locked position and an unlocked position, wherein in the locked position, the resilient locking member is pivotally moved to engage with the ratchet gear so as to limit the ratchet gear to incrementally rotate in one predetermined direction with respect to the supporting frame, wherein in the unlocked position, the resilient locking member is pivotally moved to disengage from the ratchet gear so as to allow the ratchet gear to freely rotate with respect to the supporting frame.

Another aspect of the present invention provides a tension adjustment unit for a canopy assembly having a canopy fabric and a tightening wire, comprising:

a supporting frame;

a ratchet gear;

a main shaft connected to the ratchet gear and rotatably connected to the supporting frame for driving the ratchet gear to rotate with respect to the supporting frame; and a resilient locking member mounted on the supporting frame to move between a locked position and an unlocked position, wherein in the locked position, the resilient locking member is pivotally moved to engage with the ratchet gear so as to limit the ratchet gear to incrementally rotate in one predetermined direction with respect to the supporting frame, wherein in the unlocked position, the resilient locking member is pivotally moved to disengage from the ratchet gear so as to allow the ratchet gear to freely rotate with respect to the supporting frame.

This summary presented above is provided merely to introduce certain concepts and not to identify any key or essential features of the claimed subject matter.

DETAILED DESCRIPTION OF THE PREFERRED EMBODIMENT

Figure 1:
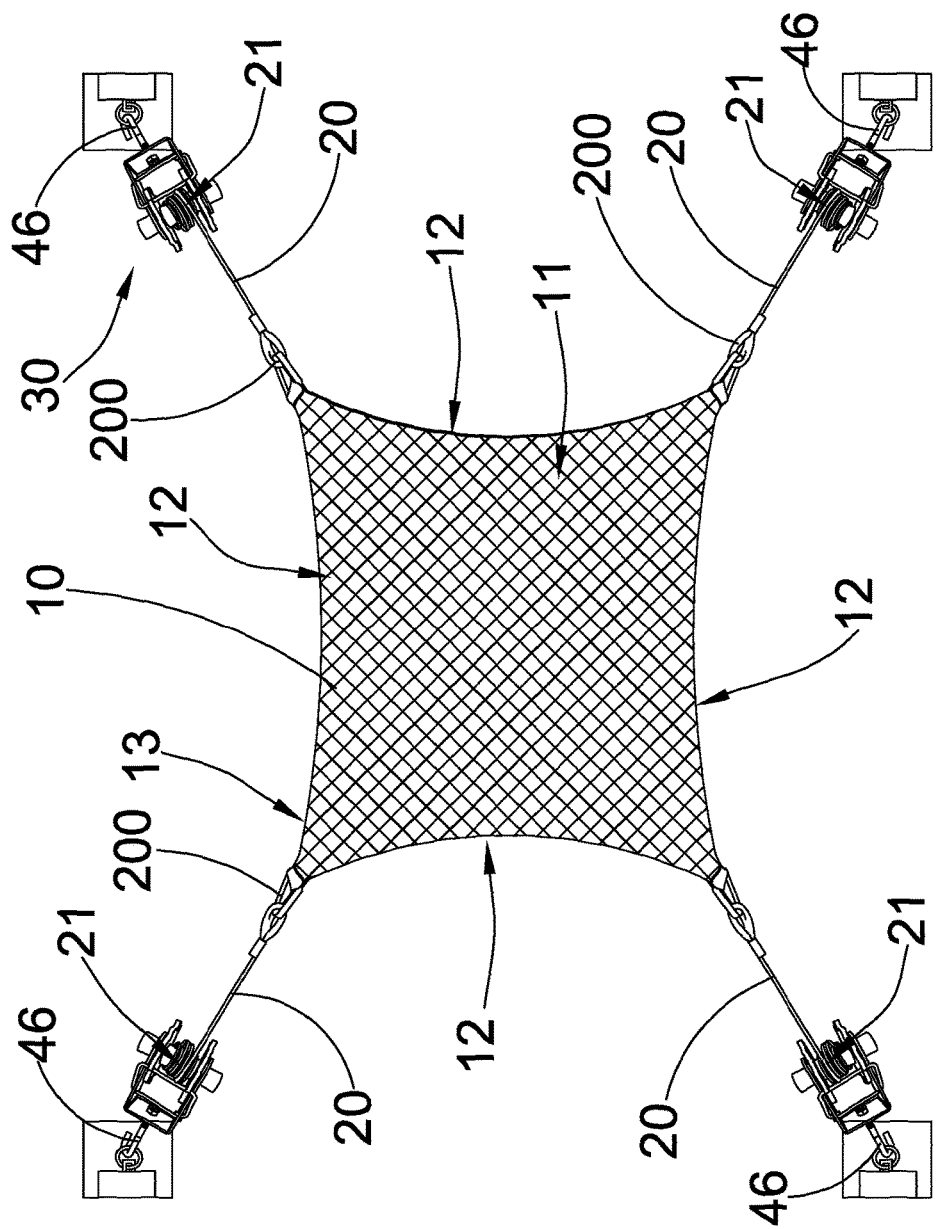
FIG. 1 is a schematic diagram of a canopy assembly according to a preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 12 of the drawings, a canopy assembly according a preferred embodiment of the present invention is illustrated. Broadly, the canopy assembly may comprise a canopy fabric 10, a plurality of tightening wires 20, and a fastening arrangement 30.

The canopy fabric 10 may have a main fabric portion 11 and a corner portion 13 surrounding the main fabric portion 11.

Each of the tightening wires 20 may be connected to the corresponding corner portion 13 of the canopy fabric 10 and may have a connecting portion 21.

The fastening arrangement 30 may comprise at least one tension adjustment unit 40, which may comprise a supporting frame 41, a ratchet gear 42, a main shaft 43 and a resilient locking member 44.

The main shaft 43 may be connected to the ratchet gear 42 and may be rotatably connected to the supporting frame 41 for driving the ratchet gear 42 to rotate with respect to the supporting frame 41. The connecting portion 21 of the tightening wire 20 may be connected to the main shaft 43.

The resilient locking member 44 may be mounted on the supporting frame 41 to move between a locked position and an unlocked position, wherein in the locked position, the resilient locking member 44 may be pivotally moved to engage with the ratchet gear 42 so as to limit the ratchet gear 42 to incrementally rotate in one predetermined direction with respect to the supporting frame 41, wherein in the unlocked position, the resilient locking member 44 may be pivotally moved to disengage from the ratchet gear 42 so as to allow the ratchet gear 42 to freely rotate with respect to the supporting frame 41.

According to the preferred embodiment of the present invention, the canopy fabric 10 may be made of high-strength fabric material which may provide effective shading to the people or object underneath. The canopy fabric 10 may be configured as having a wide variety of cross sectional shapes when viewed from the top. In this preferred embodiment, the canopy fabric 10 may have a rectangular cross-sectional shape when viewed from the top. Other cross-sectional shapes are also possible, such a square cross-sectional shape, a triangular cross-sectional shape or even a circular cross-sectional shape. The canopy fabric 10 may be made of a wide variety of materials, with or without reinforcing stitching.

Thus, the canopy fabric 10 may have four peripheral rim portions 12 each corresponding as four side edges of the canopy fabric 10. The canopy fabric 10 may further have a plurality of corner portions 13, wherein each of the four corner portions 13 may be formed between each two adjacent peripheral rim portions 12. One end of each of the tightening wires 20 may be connected to the corresponding corner portion 13 through two loop connectors 200. It is worth mentioning that the tightening wires 20 may be configured from metallic material and may have one end connected to the corresponding corner portion 13 of the canopy fabric 10. The four connecting portions 21 may be connected to the fastening arrangement 30 respectively (described in more details below).

The fastening arrangement 30 may comprise four tension adjustment units 40 connected to the four corner portions 13 of the canopy fabric 10 respectively through the corresponding connecting wire 20. Each of the tension adjustment units 40 may be structurally identical. Referring to FIG. 2 to FIG. 5 of the drawings, the supporting frame 41 of each of the tension adjustment units 40 may have a U-shaped cross-sectional shape when viewed from the front or from the rear. Each of the supporting frames 41 may have one top reinforcing wall 413, a first sidewall 411 and a second sidewall 412 integrally extended from two ends of the top reinforcing wall 413 respectively to form an engaging cavity 414 as a space surrounded by the top reinforcing wall 413, the first sidewall 411, and the second sidewall 412. Each of the supporting frames 41 may be made of metallic material and configured as a one-piece component to maximize its structural integrity.

Each of the tension adjustment units 40 may comprise two ratchet gears 42 spacedly provided on the main shaft 43. Each of the ratchet gears 42 may have a plurality of ratchet teeth 421 for engaging with the resilient locking member 44. In this preferred embodiment, the two ratchet gears 42 may be provided on two end portions of the main shaft 43 and positioned adjacent to inner surface of the first sidewall 411 and the second sidewall 412 respectively. The ratchet gears 42 may be integrally connected to the main shaft 43 to form an integral structure for maximizing the structural integrity of the ratchet gears 42 and the main shaft 43. The main shaft 43 may be rotatably mounted to the first sidewall 411 and the second sidewall 412 of the supporting frame 41 through a plurality of end connectors 45, such as two hexagonal bolt nuts. The main shaft 43 may be secured in the engaging cavity 414 so that the ratchet gears 42 are provided between the first sidewall 411 and the second sidewall 412.

The main shaft 43 of each of the tension adjustment units 40 may have a plurality of through connecting holes 431 spacedly formed thereon, wherein the corresponding connecting portion 21 of the tightening wire 20 may pass through the two connecting holes 431 for connecting the main canopy 10 to the corresponding tension adjustment unit 40. The tightening wire 20 may pass through one of the connecting holes 431 from one side of the main shaft, wrap around main shaft 43, and pass through the remaining connecting hole 431 from the other side of the main shaft 43. As such, the rotation of the main shaft 431 may retract the tightening wire 20 and increase or decrease a tension of the tightening wire 20, as shown in FIG. 1 of the drawings.

The resilient locking member 44 may be configured as an elongated locking latch bent into a plurality of locking sections (described below) for engaging with the supporting frame 41 and the ratchet gears 42. Specifically, the resilient locking member 44 may have a main latching section 441, a first linkage section 442, a second linkage section 443, a first pivot section 444 and a second pivot section 445. The first linkage section 442 and the second linkage section 443 may be extended from two ends of the main latching section 441, which may be arranged to engage with one ratchet tooth 421 of the two ratchet gears 42. The first pivot section 444 may be extended from the first linkage section 442, and the second pivot section 445 may be extended from the second linkage section 443. In this preferred embodiment, the main latching section 441, the first linkage section 442, the second linkage section 443, the first pivot section 444 and the second pivot section 445 may be an integral component forming the elongated locking latch.

As shown in FIG. 2, FIG. 3, FIG. 8 and FIG. 9 of the drawings, each of the ratchet teeth 421 may have a curved surface 4211 extending along a circumferential direction for the ratchet gear 42, and a locking surface 4212 extending from an outer edge of the curved surface 4211 substantially toward a center of the ratchet gear 42. The locking surface 4212 may have a radius of curvature different from that of the curved surface 4211. A circumferential length of the curved surface 4211 is greater than that of the locking surface 4212. Thus, a locking shoulder 422 may be formed between each two adjacent ratchet teeth 421 as an intersection between a curved surface 4211 of a given ratchet tooth 421 and a locking surface 4212 of an adjacent ratchet tooth 421.

Figure 8:
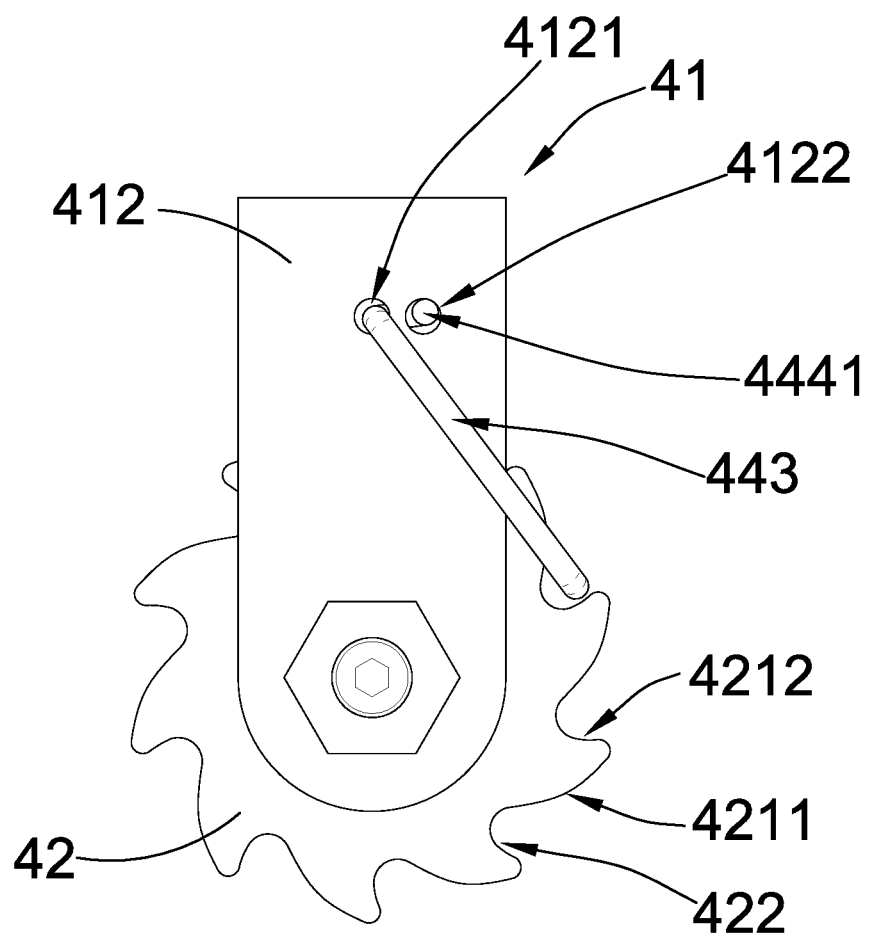
FIG. 8 is a schematic diagram of the resilient locking member according to the preferred embodiment of the present invention, illustrating that the resilient locking member is in the locked position.

Accordingly, when the main latch section 441 of the corresponding resilient locking member 44 is engaged in the locking shoulders 422 of the ratchet gears 42 of a corresponding tension adjustment unit 40, the ratchet gears 42 may be prevented from rotating in a direction toward the main latching section 441 (e.g. an anti-clockwise direction shown in FIG. 8 of the drawings) because the main latching section 441 may block further rotational movement of the ratchet gears 42 by biasing against the relevant locking surfaces 4212. On the other hand, the ratchet gears 42 may be allowed to rotate in a direction away from the main latching section 441 (e.g. clockwise direction as shown in FIG. 8 of the drawings) because the main latching section 441 may travel along (i.e. slide along) the relevant curved surfaces 4211 until the main latching section 441 is engaged with the next locking shoulder 422.

The first linkage section 442 and the second linkage section 443 may extend from two ends of the main latching section 441 at outer sides of the two sidewalls 411, 412 of the supporting frame 41 respectively. The first linkage section 442 and the second linkage section 443 may extend along a transverse direction of the main latching section 441.

Figure 2:
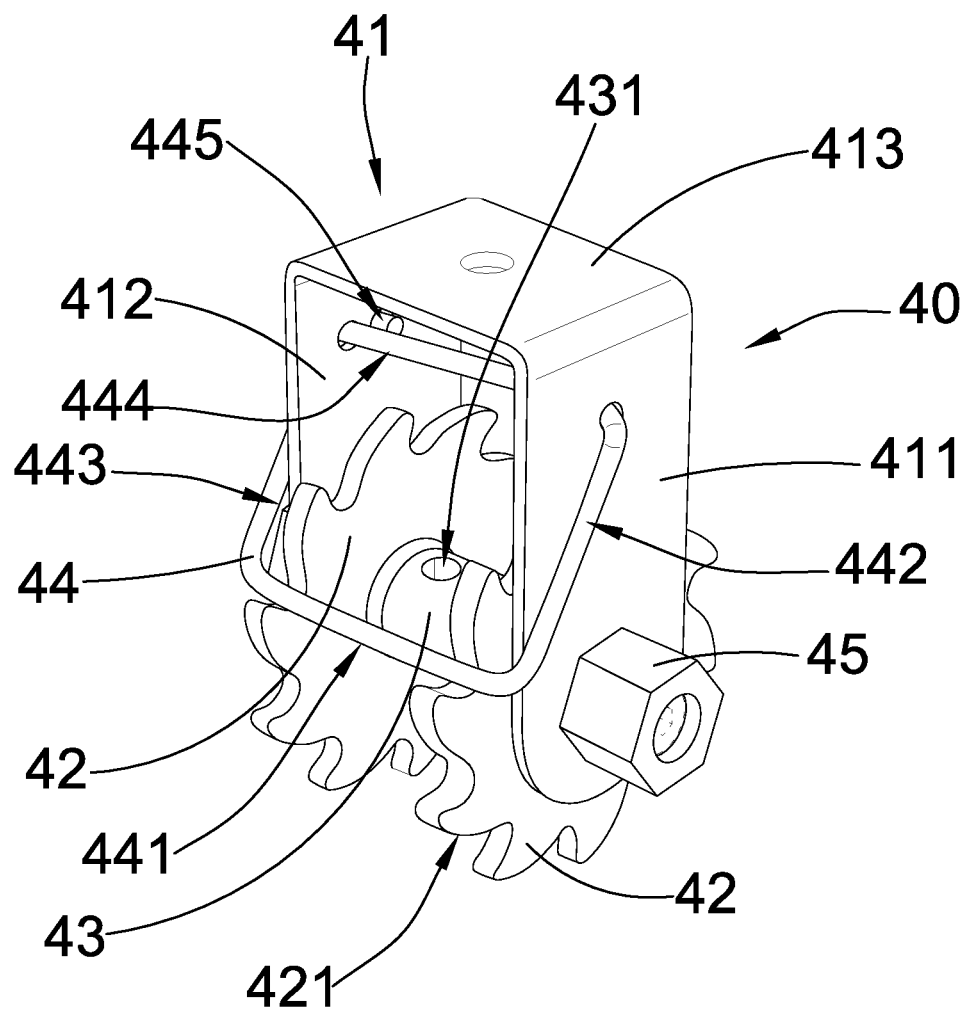
FIG. 2 is a perspective view of a tension adjustment unit according to the preferred embodiment of the present invention.
Figure 3:
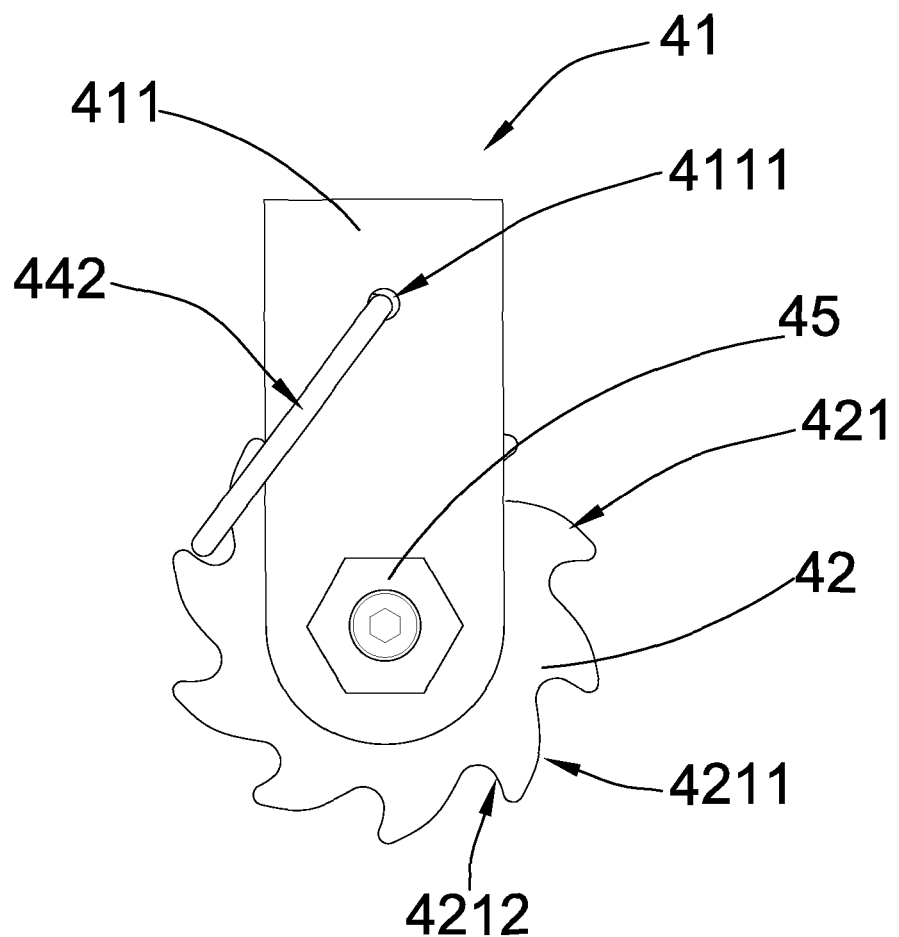
FIG. 3 is a side view of the tension adjustment unit according to the preferred embodiment of the present invention.
Figure 4:
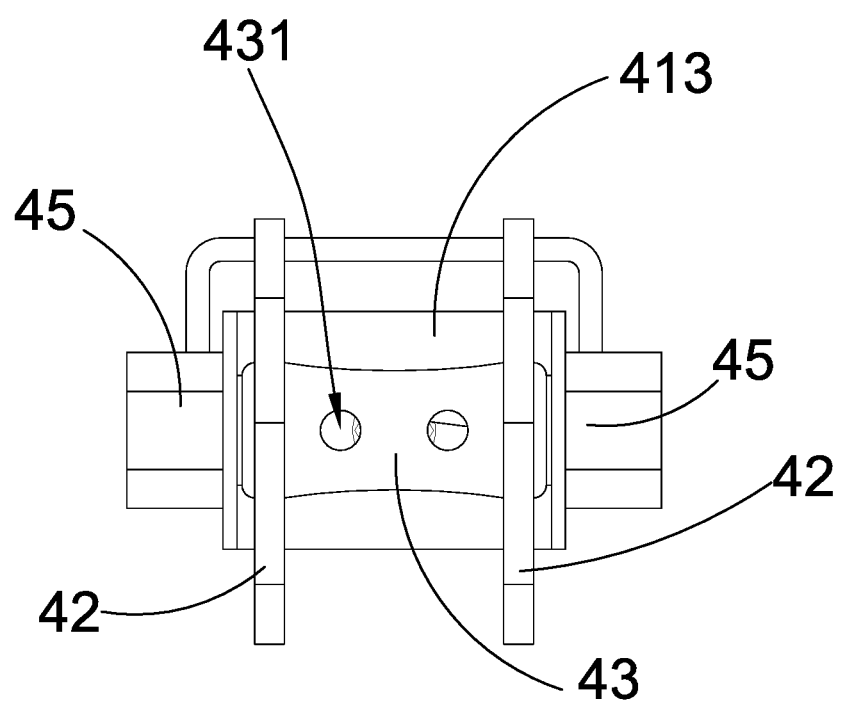
FIG. 4 is a bottom view of the tension adjustment unit according to the preferred embodiment of the present invention.
Figure 5:
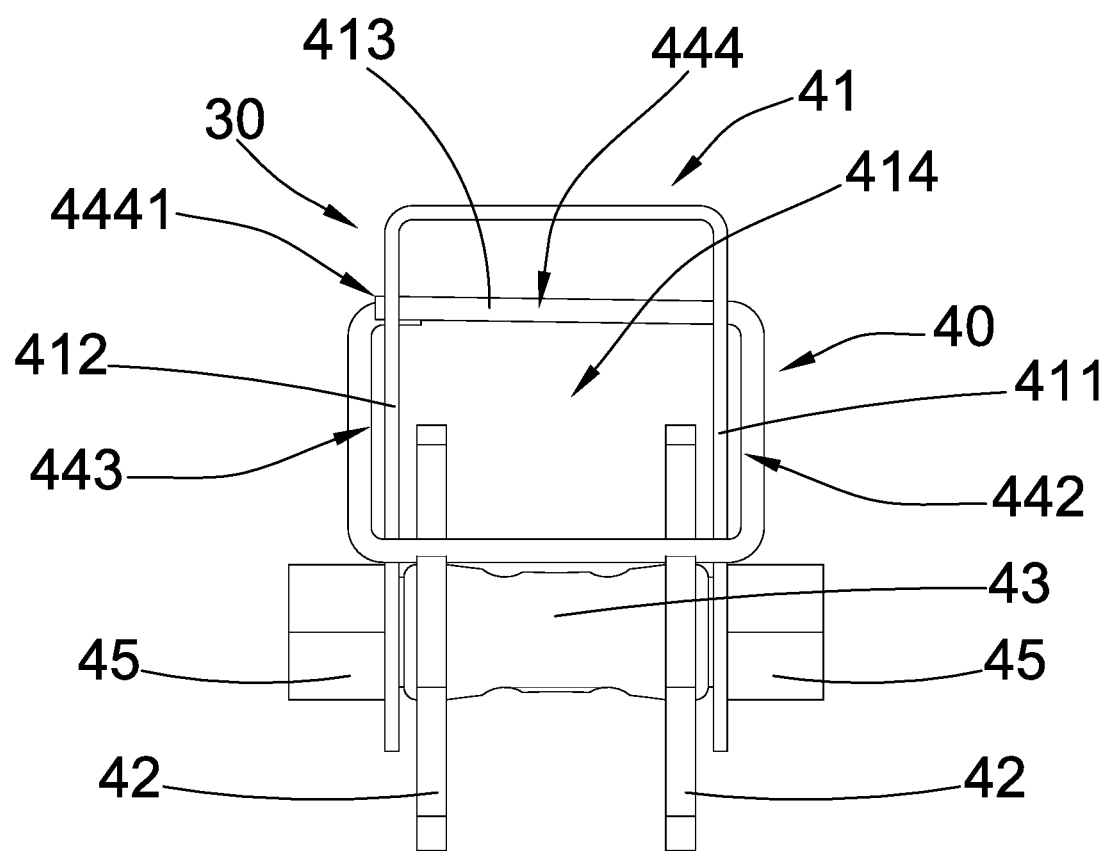
FIG. 5 is a front view of the tension adjustment unit according to the preferred embodiment of the present invention.
Figure 6:
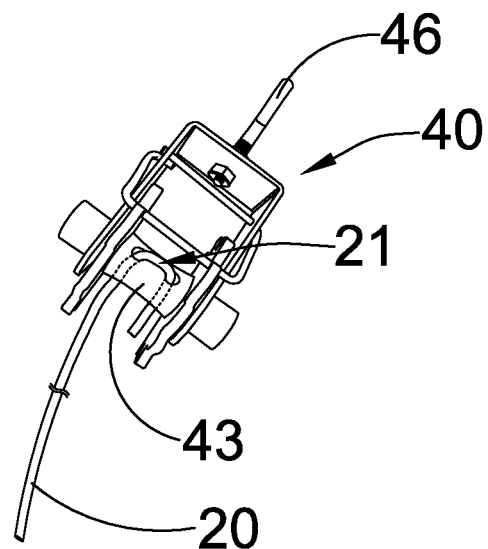
FIG. 6 is a schematic diagram of the tension adjustment unit according to the preferred embodiment of the present invention, illustrating that a tightening wire is about to mount on a main shaft.
Figure 7:
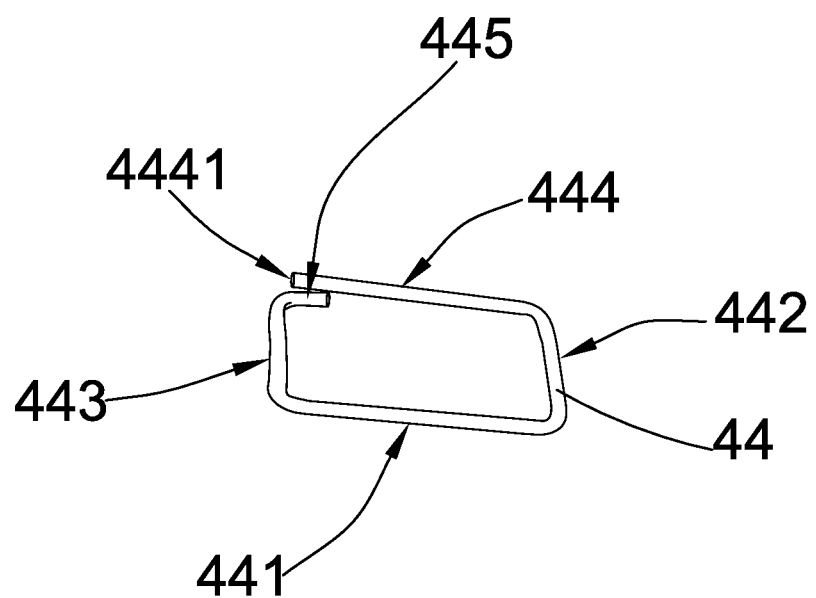
FIG. 7 is a schematic diagram of the resilient locking member according to the preferred embodiment of the present invention.

In the preferred embodiment, the first linkage section 442 may extend along an outer surface of the first sidewall 411, while the second linkage section 443 may extend along an outer surface of the second sidewall 412, as shown in FIG. 2 of the drawings.

On the other hand, the first pivot section 444 and the second pivot section 445 may extend toward the engaging cavity 414 of the supporting frame 41 through the sidewalls 411, 412 respectively. Accordingly, the first sidewall 411 may have a first through hole 4111 for allowing the first pivot section 444 to pass therethrough. Similarly, the second sidewall 412 may have a second through hole 4121 for allowing the second pivot section 445 to pass therethrough. A length of the first pivot section 444 is substantially greater than that of the second pivot section 445 so that the first pivot section 444 may penetrate through the first sidewall 411 and extend across the engaging cavity 414 to reach the second sidewall 412.

The second sidewall 412 may further have a third through hole 4122 formed adjacent to the second through hole 4121 such that the first pivot section 444 may also pass through the third through hole 4122 when the resilient locking member 44 is in the locked position. Thus, when the resilient locking member 44 is in the locked position, the main latching section 441 may be engaged in one of the locking shoulders 422 while the first pivot section 444 and the second pivot section 445 may be pivotally and rotatably connected to the first sidewall 411 and the second sidewall 412 through the first through hole 4111 and the second through hole 4121 respectively. Additionally, a free end of the first pivot section 444 may be arranged to pass through the third through hole 4122 when the resilient locking member 44 is in the locked position.

It is worth mentioning that the first through hole 4111 and the second through hole 4121 may correspond (align) with each other so that an imaginary line joining a center of the first through hole 4111 and a center of the second through hole 4121 may constitute an axis of pivotal or rotational movement of the first linkage section 442, the second linkage section 443, and the main latching section 441. In the words, the first linkage section 442 and the second linkage section 443 may rotate or pivot about this imaginary axis when moving from the locked position to the unlocked position. The main latching section 441, which extends between the first linkage section 442 and the second linkage section 443, may pivotally move or revolve around the imaginary axis mentioned before.

Each of the first linkage section 442 and the second linkage section 443 may have a predetermined resilient ability such that when the resilient locking member 44 is in the unlocked position, the resilient locking member 44 may be pivotally move about the imaginary axis such that a free end 4441 of the first pivot section 444 may disengage from the third through hole 4122 and move or rotate in a circular locus around the second through hole 4121 as the main latching section 441 moves from the front side of the supporting frame 41 to a rear side thereof. This movement or circular locus may be visualized in FIG. 8 and FIG. 9 of the drawings.

Figure 9:
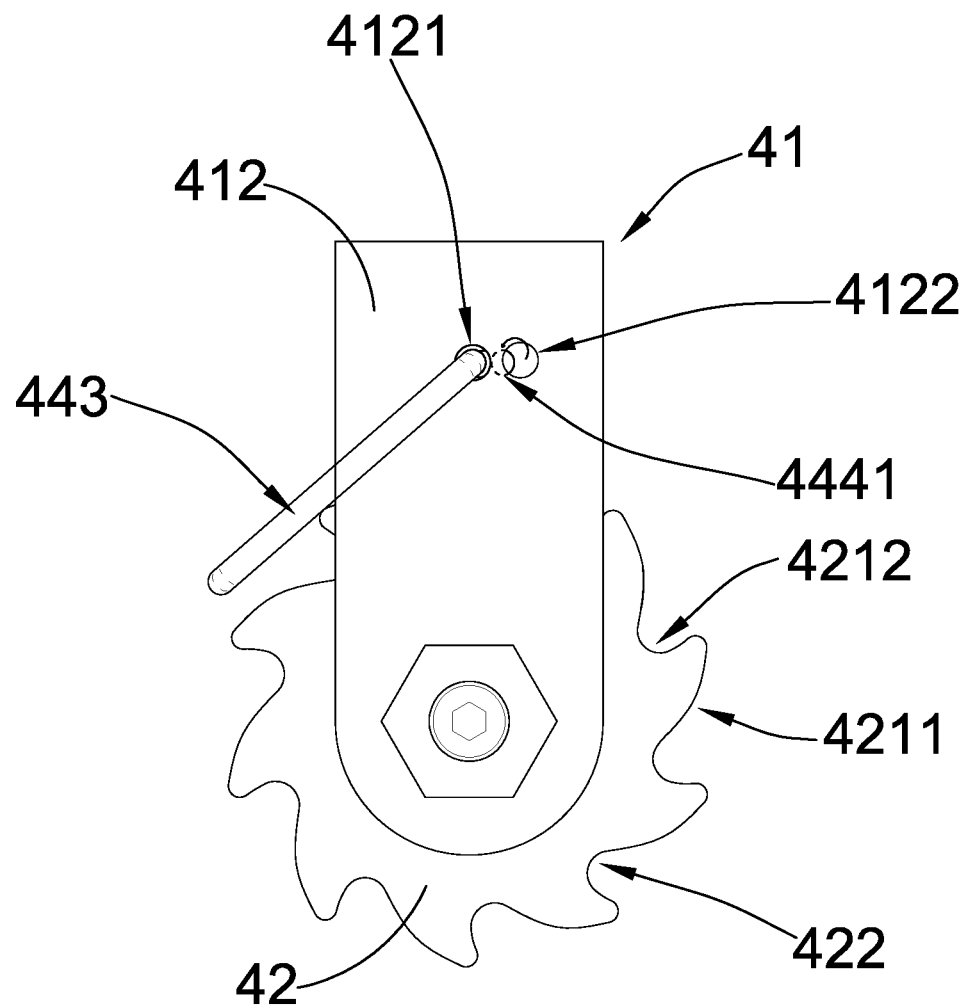
FIG. 9 is a schematic diagram of the resilient locking member according to the preferred embodiment of the present invention, illustrating that the resilient locking member is in the unlocked position.
Figure 10:
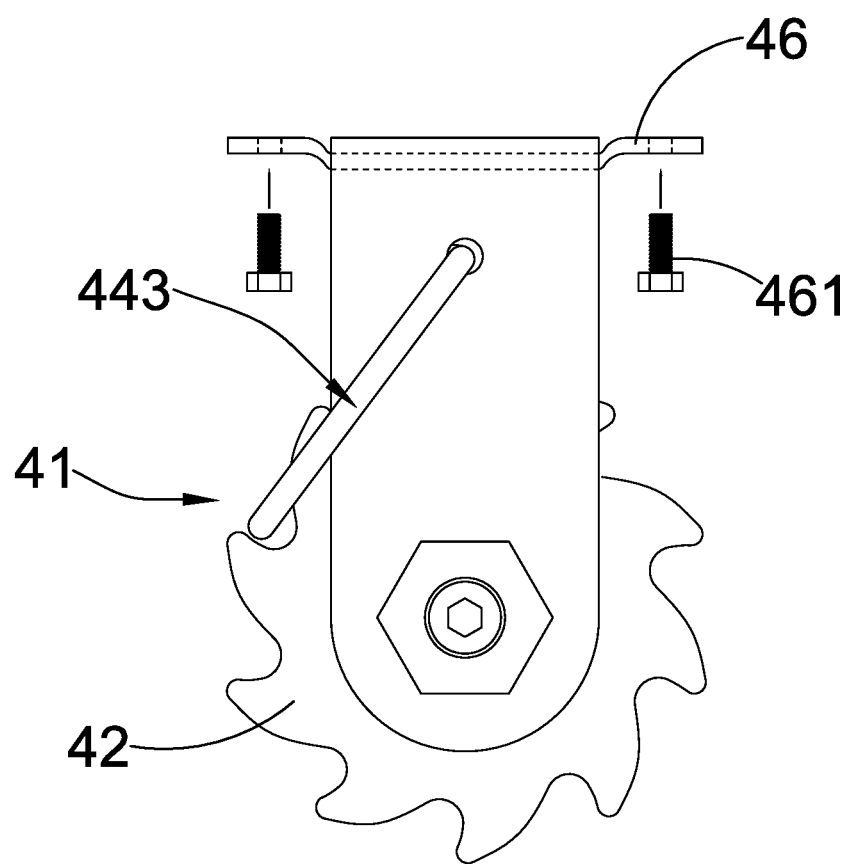
FIG. 10 is a schematic diagram of the resilient locking member according to the preferred embodiment of the present invention, illustrating that the mounting member is a mounting plate.
Figure 11:
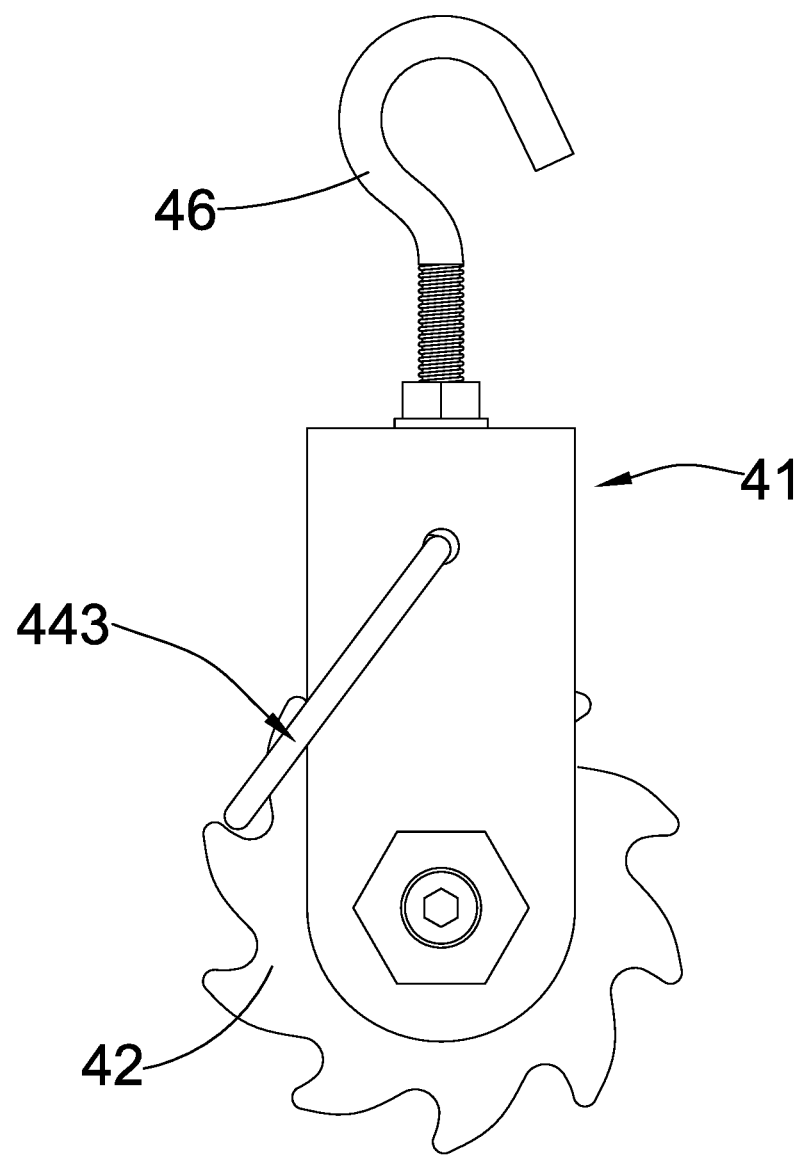
FIG. 11 is a schematic diagram of the resilient locking member according to the preferred embodiment of the present invention, illustrating that the mounting member is a hook.
Figure 12:
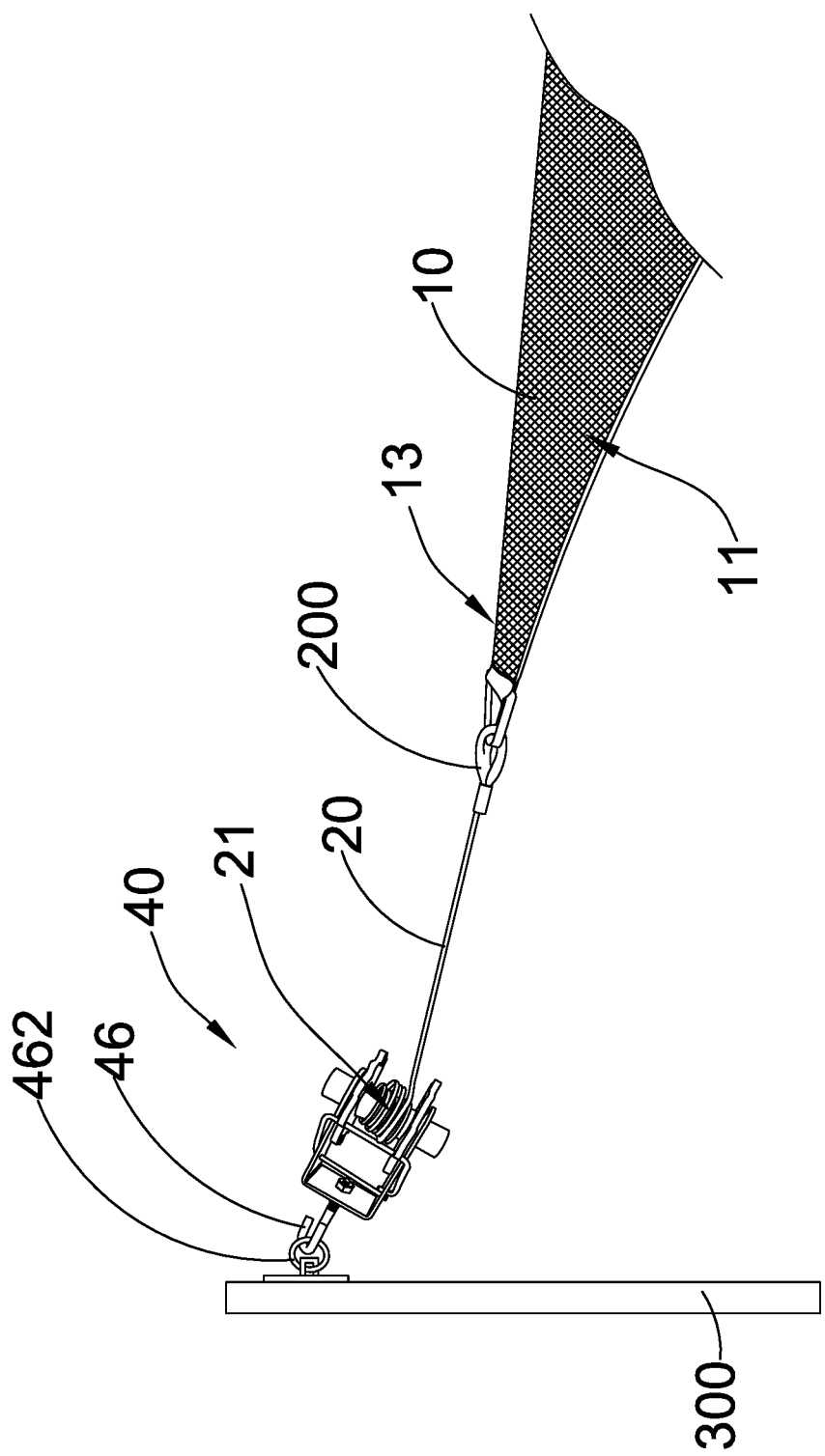
FIG. 12 is a schematic diagram illustrating that the tension adjustment unit is utilized for mounting a canopy fabric on an external object through a tightening wire.

When the resilient locking member 44 moves from the locked position to the unlocked position, the free end 4441 of the first pivot section 444 may travel in a substantially circular motion about the imaginary axis. In other words, a center of the circular motion of the free end 4441 as projected to the second sidewall 412 may coincide with a center of the second through hole 4121. When the resilient locking member 44 is in the unlocked position, the main latching section 441 may disengage from the ratchet gears 42 so that the main shaft 43 and the ratchet gears 42 may rotate freely with respect to the first sidewall 411 and the second sidewall 412, as shown in FIG. 9 of the drawings.

It is worth clarifying that the unlocked position of the resilient locking member 44 is where the main latching section 441 disengages from the ratchet gears 42. It is not necessary that the resilient locking member 44 is flipped over to the rear side of the supporting frame 41. Rather, when the resilient locking member 44 is in the unlocked position (i.e. a position where the main latching section 441 disengages from the ratchet gears 42), the resilient locking member 44 may be rotated and flipped from the front side of the supporting frame 41 to the rear side thereof, as described above.

Each of the tension adjustment unit 40 may further comprise a mounting member 46 provided on the supporting frame 41 for mounting the corresponding tension adjustment unit 40 to an external object, such as a post or a wall. Specifically, the mounting member 46 may be embodied as a hook (see FIG. 11) connected to the top reinforcing wall 413 of the supporting frame 41. The hook may be hung on an external object.

Alternatively, the mounting member 46 may be embodied as a mounting plate (see FIG. 10) arranged to be mounted on an external object (such as a wall or a post 300) through a plurality of conventional screws 461 or a connector ring 462, whichever appropriate. The purpose of the mounting member 46 may be to secure the corresponding tension adjustment unit 40 on the external object.

The operation of the present invention may be as follows: the fastening arrangement 30 may be utilized to secure the canopy fabric 10 on an external object and at the same time provide an apparatus which may allow a user to easily and conveniently adjust the tension of the canopy fabric 10. For example, when the canopy fabric 10 has a rectangular cross-sectional shape, the fastening arrangement 30 may comprise four tension adjustment units 40 connected to four corner portions 13 of the canopy fabric 10 in a manner described above.

For each of the tension adjustment units 40, the relevant connecting portion 21 of the tightening wire 20 may be secured to the main shaft 43 by passing through the connecting holes 431. When the resilient locking member 44 is in the locked position, the main shaft 43 and the ratchet gears 42 may be locked such that the main shaft 43 and the ratchet gears 42 can only rotate in one predetermined direction. When properly arranged, the rotation of the ratchet gears 42 in this direction may tighten the tightening wire 20 so as to increase the tension thereof for stretching the canopy fabric 10 in the direction of this corresponding tension adjustment unit 40. Thus, when a user wishes to tighten the canopy fabric 10, he may simply use a simple hand tool, such as a spanner, to turn the main shaft 43 to rotate until the main latching section 441 of the resilient locking member 44 comes to engage with the next locking shoulder 422 of the ratchet gears 42. One may therefore appreciate that the tension exerted to the canopy fabric 10 may be increased incrementally as the main latching section 441 comes to engage with subsequent locking shoulders 422. At the same time, the connecting potion 21 of the corresponding tightening wire 20 may be retracted and secured on the main shaft 43. Since each of the tension adjustment units 40 may be secured to an external object, the canopy fabric 10 may therefore be secured to the external object and optimally stretched and expand to provide shade to the people or items underneath the canopy fabric 10.

On the other hand, when the user wishes to decrease the tension exerted to the canopy fabric 10, he may manually lift up the main latching section 441 of the resilient locking member 44 and rotate the main shaft 43 and the ratchet gears 42 in an opposite direction. By doing so, the resilient locking member 44 may be lifted to an unlocked position and the main shaft 43 may be rotated so as to decrease the tension exerted on the canopy fabric 10.

The present invention, while illustrated and described in terms of a preferred embodiment and several alternatives, is not limited to the particular description contained in this specification. Additional alternative or equivalent components could also be used to practice the present invention.

What is claimed is:

1. A canopy assembly, comprising:
a canopy fabric having a main fabric portion and at least one corner portion;
at least one tightening wire connected to said corner portion of said canopy fabric respectively, said tightening wire having a connecting portion; and
a fastening arrangement comprising at least one tension adjustment unit, which comprises:
a supporting frame, having a top reinforcing wall, a first sidewall and a second sidewall integrally extended from two ends of said top reinforcing wall respectively to form an engaging cavity as a space surrounded by said top reinforcing wall, said first sidewall, and said second sidewall;
a ratchet gear having a plurality of ratchet teeth;
a main shaft connected to said ratchet gear and rotatably connected to said supporting frame for driving said ratchet gear to rotate with respect to said supporting frame, said connecting portion of said tightening wire connecting to said main shaft; and
a resilient locking member mounted on said supporting frame to move between a locked position and an unlocked position, wherein in said locked position, said resilient locking member is pivotally moved to engage with said ratchet gear so as to limit said ratchet gear to incrementally rotate in one predetermined direction with respect to said supporting frame, wherein in said unlocked position, said resilient locking member is pivotally moved to disengage from said ratchet gear so as to allow said ratchet gear to freely rotate with respect to said supporting frame,
wherein said resilient locking member has a main latching section, a first linkage section, a second linkage section, a first pivot section and a second pivot section, said first linkage section and said second linkage section extending from two ends of said main latching section, which is arranged to engage with one ratchet tooth of said ratchet gear, said first pivot section extending transversely from said first linkage section, and said second pivot section transversely extending from said second linkage section.

2. The canopy assembly, as recited in claim 1, wherein each of said ratchet teeth has a curved surface extending along a circumferential direction of said ratchet gear, and a locking surface extending from an outer edge of said curved surface and substantially toward a center of said ratchet gear, said locking surface having a radius of curvature different from that of said curved surface, a circumferential length of said curved surface is greater than that of said corresponding locking surface to form a locking shoulder between each two adjacent ratchet teeth as an intersection between said curved surface of a given ratchet tooth and said locking surface of said adjacent ratchet tooth.

3. The canopy assembly, as recited in claim 2, wherein said first sidewall has a first through hole and said second sidewall has a second through hole, said first linkage section and said second linkage section extending from two ends of said main latching section at outer sides of said two sidewalls of said supporting frame respectively, said first pivot section and said second pivot section extending toward said engaging cavity of said supporting frame through said first through hole and said second through hole respectively.

4. The canopy assembly, as recited in claim 3, wherein said second sidewall further has a third through hole formed adjacent to said second through hole such that said first pivot section is arranged to pass through said third through hole when said resilient locking member is in said locked position.

5. The canopy assembly, as recited in claim 4, wherein each of said first linkage section and said second linkage section has a predetermined resilient ability such that when said resilient locking member is in said unlocked position, said resilient locking member is capable of being pivotally moved in such a manner that a free end of said first pivot section disengages from said third through hole.

6. The canopy assembly, as recited in claim 5, wherein said tension adjustment unit comprises one more ratchet gear, said ratchet gears being spacedly provided on two end portions of said main shaft and positioned adjacent to an inner surface of said first sidewall and said second sidewall respectively, said ratchet gears being integrally connected to said main shaft, which is secured in said engaging cavity and rotatably mounted to said first sidewall and said second sidewall of said supporting frame.

7. The canopy assembly, as recited in claim 6, wherein said main shaft has a plurality of through connecting holes spacedly formed thereon, said tightening wire has a connecting portion passing through said two connecting holes for connecting said main canopy to said tension adjustment unit.

8. The canopy assembly, as recited in claim 7, wherein said tension adjustment unit further comprise a mounting member provided on said supporting frame for mounting said corresponding tension adjustment unit to an external object.

9. A tension adjustment unit for a canopy assembly having a canopy fabric and a tightening wire, comprising:
   a supporting frame having a top reinforcing wall, a first sidewall and a second sidewall integrally extended from two ends of said top reinforcing wall respectively to form an engaging cavity as a space surrounded by said top reinforcing wall, said first sidewall, and said second sidewall;
   a ratchet gear having a plurality of ratchet teeth;
   a main shaft connected to said ratchet gear and rotatably connected to said supporting frame for driving said ratchet gear to rotate with respect to said supporting frame; and
   a resilient locking member mounted on said supporting frame to move between a locked position and an unlocked position, wherein in said locked position, said resilient locking member is pivotally moved to engage with said ratchet gear so as to limit said ratchet gear to incrementally rotate in one predetermined direction with respect to said supporting frame, wherein in said unlocked position, said resilient locking member is pivotally moved to disengage from said ratchet gear so as to allow said ratchet gear to freely rotate with respect to said supporting frame,
   wherein said resilient locking member has a main latching section, a first linkage section, a second linkage section, a first pivot section and a second pivot section, said first linkage section and said second linkage section extending from two ends of said main latching section, which is arranged to engage with one ratchet tooth of said two ratchet gear, said first pivot section extending transversely from said first linkage section, and said second pivot section transversely extending from said second linkage section.

10. The tension adjustment unit, as recited in claim 9, wherein each of said ratchet teeth has a curved surface extending along a circumferential direction of said ratchet gear, and a locking surface extending from an outer edge of said curved surface and substantially toward a center of said ratchet gear, said locking surface having a radius of curvature different from that of said curved surface, a circumferential length of said curved surface is greater than that of said corresponding locking surface to form a locking shoulder between each two adjacent ratchet teeth as an intersection between said curved surface of a given ratchet tooth and said locking surface of said adjacent ratchet tooth.

11. The tension adjustment unit, as recited in claim 10, wherein said first sidewall has a first through hole and said second sidewall has a second through hole, said first linkage section and said second linkage section extending from two ends of said main latching section at outer sides of said two sidewalls of said supporting frame respectively, said first pivot section and said second pivot section extending toward said engaging cavity of said supporting frame through said first through hole and said second through hole respectively.

12. The tension adjustment unit, as recited in claim 11, wherein said second sidewall further has a third through hole formed adjacent to said second through hole such that said first pivot section is arranged to pass through said third through hole when said resilient locking member is in said locked position.

13. The tension adjustment unit, as recited in claim 12, wherein each of said first linkage section and said second linkage section has a predetermined resilient ability such that when said resilient locking member is in said unlocked position, said resilient locking member is capable of being pivotally moved in such a manner that a free end of said first pivot section disengages from said third through hole.

14. The tension adjustment unit, as recited in claim 13, wherein said tension adjustment unit comprises one more ratchet gear, said ratchet gears being spacedly provided on two end portions of said main shaft and positioned adjacent to an inner surface of said first sidewall and said second sidewall respectively, said ratchet gears being integrally connected to said main shaft, which is secured in said engaging cavity and rotatably mounted to said first sidewall and said second sidewall of said supporting frame.

15. The tension adjustment unit, as recited in claim 14, wherein said main shaft has a plurality of through connecting holes spacedly formed thereon for allowing said tightening wire to pass therethrough.

16. The tension adjustment unit, as recited in claim 15, wherein said tension adjustment unit further comprise a mounting member provided on said supporting frame for mounting said corresponding tension adjustment unit to an external object.

* * * * *